United States Patent [19]

Fischer et al.

[11] Patent Number: 5,208,056
[45] Date of Patent: May 4, 1993

[54] PROCESS FOR DECAFFEINATING RAW COFFEE

[75] Inventors: Arthur G. Fischer, Niedergosgen; Peter M. Kummer, Neunkirch, both of Switzerland

[73] Assignee: Chocolat Suchard Societe Anonyme, Neuchatel, Switzerland

[21] Appl. No.: 459,522

[22] Filed: Jan. 2, 1990

Related U.S. Application Data

[63] Continuation of Ser. No. 824,654, Jan. 31, 1986, abandoned, which is a continuation of Ser. No. 656,503, Oct. 1, 1984, abandoned, which is a continuation of Ser. No. 257,710, Apr. 27, 1981, abandoned, which is a continuation of Ser. No. 62,632, Aug. 1, 1979, abandoned.

[30] Foreign Application Priority Data

Aug. 22, 1978 [CH] Switzerland .................. 8891/78

[51] Int. Cl.$^5$ ............................... A23F 5/18
[52] U.S. Cl. ................................ 426/422; 426/423; 426/427
[58] Field of Search .................. 426/422, 423, 427

[56] References Cited

U.S. PATENT DOCUMENTS

| 1,930,257 | 10/1933 | Stelkins | 426/132 |
|---|---|---|---|
| 2,151,582 | 3/1939 | Block | 426/422 X |
| 2,198,859 | 4/1940 | Burgin | 426/427 |
| 2,309,092 | 1/1943 | Berry et al. | 426/424 |
| 4,031,251 | 6/1977 | Margolis et al. | 426/422 |
| 4,044,162 | 8/1977 | Lando | 426/427 |
| 4,113,887 | 9/1978 | Kramer et al. | 426/422 |
| 4,113,888 | 9/1978 | Hevig et al. | 426/422 |
| 4,160,042 | 7/1979 | Farr et al. | 426/427 X |
| 4,168,324 | 9/1979 | Roselius et al. | 426/478 X |

FOREIGN PATENT DOCUMENTS

| 553800 | 6/1932 | Fed. Rep. of Germany | 426/422 |
|---|---|---|---|
| 567452 | 1/1933 | Fed. Rep. of Germany | 426/422 |
| 46540 | 6/1929 | Norway | 426/427 |
| 59180 | 3/1938 | Norway | 426/427 |
| 169031 | 10/1934 | Switzerland | |
| 354942 | 8/1931 | United Kingdom | 426/427 |

OTHER PUBLICATIONS

Translation of German Patent No. 685,367 dated Dec. 16, 1939, 3 pages.

Primary Examiner—Joseph Golian
Attorney, Agent, or Firm—Burns, Doane, Swecker & Mathis

[57] ABSTRACT

Caffeine is extracted from the raw coffee by means of an aqueous liquid and adsorbed from the latter on an adsorption agent such as activated charcoal. In order for the adsorption agent to absorb as little as possible of other substances that are extractable from the coffee, the agent is previously loaded with such other extractable substances or with substitute substances having a molecular structure and size similar to the latter, more particularly with carbohydrates as exemplified by cane sugar. The aqueous extractant is preferably a caffeine-free coffee extract solution which substantially extracts only caffeine from the coffee. Other aqueous liquids may be employed, but generally require recombination with the coffee after the adsorption step.

8 Claims, No Drawings

PROCESS FOR DECAFFEINATING RAW COFFEE

This application is a continuation of application Ser. No. 824,654, filed Jan. 31, 1986 which application is a continuation of Ser. No. 656,503, filed on Oct. 1, 1984; which is a continuation of Ser. No. 257,710, filed on Apr. 27, 1981; which is a continuation of Ser. No. 062,632, filed on Aug. 1, 1979, all of which are now abandoned.

BACKGROUND OF THE INVENTION

1. Field of the Invention

The present invention relates to a process for removing caffeine from raw coffee. More specifically, the present invention relates to a process wherein raw coffee is contacted with an aqueous liquid to extract the caffeine therefrom and the resulting liquid is contacted with an adsorption agent that has been pre-loaded with at least one substance present in and extractable from the coffee or with a substitute therefor having a corresponding molecular structure and size.

2. Description of the Prior Art

It is known in the art that caffeine may be removed from raw coffee by various techniques. However, such known techniques generally present substantial disadvantages which detract from their use. For example, in practically all well-known processes for decaffeinating raw coffee used today, the coffee is extracted using organic solvents. A main disadvantage of this process resides in the fact that at least a trace of the solvent remains in the treated coffee. This residuum may adversely affect the taste and/or aroma of the brewed coffee product thereby decreasing its palatability.

In order to avoid the use of organic solvents, it is also known to extract the raw coffee with an aqueous liquid, to remove the caffeine from the extract solution by adsorption on an adsorption agent and subsequently to combine the remaining extract substances with the coffee beans. The disadvantage of the well-known processes of this type is that the adsorption agent, more particularly activated charcoal, adsorbs considerable quantities of other substances in the coffee besides the caffeine which thereby are lost and thus results in a product having a lower extract content.

The search has therefore continued for a process which will effectively remove caffeine from raw coffee without imparting an undesirable taste and/or aroma to the final product or substantially lessen the extract content. This invention is the result of that search.

SUMMARY AND OBJECTS OF THE INVENTION

Accordingly, it is a general object of the present invention to provide a process which eliminates or substantially obviates the problems of the prior art.

It is a more specific object of the present invention to provide a process for removing caffeine from raw coffee which does not adversely affect the quality of the final product.

It is another object of the present invention to provide a process for removing caffeine from raw coffee whereby other extractable substances in the coffee are substantially not lost.

These objects and advantages of the present invention will become apparent from the following summary and description of the preferred embodiments of the present invention.

In one aspect, the present invention provides a process for decaffeinating coffee whereby the caffeine is extracted from raw coffee by means of an aqueous liquid and is adsorbed from the resulting liquid extract by contact with an adsorption agent. The improvement of the process comprises loading the adsorption agent prior to its use for adsorbing caffeine with at least one other substance present in and extractable from the raw coffee or with a substitute for said extractable substance having a molecular structure and size corresponding to said extractable substance whereby the adsorption of coffee extract substances other than caffeine is decreased.

In another aspect, the present invention provides a process for extracting caffeine from raw coffee with an aqueous liquid and adsorbing the caffeine from said aqueous liquid by contact with a solid adsorption agent. The process comprises loading an adsorbent with an extractable substance that is co-extractable from raw coffee with caffeine or a substitute for said extractable substance having a molecular structure and size corresponding to said extractable substance and thereby forming a pre-loaded adsorption agent, passing an aqueous liquid through an extraction zone containing a batch of raw coffee and then through at least one column containing said pre-loaded adsorption agent.

DESCRIPTION OF THE PREFERRED EMBODIMENTS

As stated above, the present invention relates to a process for removing caffeine from raw coffee by extracting caffeine from the raw coffee with an aqueous liquid and contacting the resulting extract with an adsorption agent that has been pre-loaded with at least one selected non-caffeine substance.

Pretreatment of the Adsorption Agent

An adsorption agent such as activated alumina, silica gel or, preferably, activated charcoal, is charged with at least one coffee extract substance which is to be kept in the raw coffee to be decaffeinated or with a substitute substance having a similar molecular structure and molecular size. This "pre-loading" enables the adsorption agent, when it is brought into contact with a coffee extract solution, to adsorb at most a small additional amount of the coffee extract substance. In this regard, the pre-loading can be regulated such that prior to contacting the adsorption agent with the coffee extract solution, there exists a substantial equilibrium between the concerned extract substance in solution and that contained on the adsorption agent. Accordingly, the selectivity of the adsorption agent for caffeine is increased.

The selection of the pre-loading substances is generally determined by the availability of acceptable substances and prevailing economic conditions. A pre-loading substance which consists of a complete caffeine-free coffee extract would indeed be ideal but can usually be obtained only at prohibitive cost. However, numerous substances exist which substantially reduce the loss of desired extract substances while permitting caffeine adsorption. More particularly, essential coffee extract substances which are adsorbed to a considerable degree by activated charcoal are various sugars and chlorogenic acid. In order to reduce the adsorption effect of activated charcoal for these substances, it can be pre-loaded with sucrose and/or glucose and/or other carbohydrates. Additionally or instead of the latter, chlorogenic acid can also be used, but is presently substantially more expensive than sucrose in the form of cane sugar. Other acceptable coffee extract substances or substitutes therefor will be apparent to those of ordinary skill in the coffee art.

For the pre-loading, an aqueous solution of the pre-loading substances is brought into contact with the adsorption agent. More specifically, the solution having a pre-determined concentration of the pre-loading substance or substances is placed in a heatable tank, heated to a specified temperature and then pumped through a column containing the adsorption agent in circulation from the tank. The concentration of the pre-loading substances in the solution is regulated such that they are substantially equal to the concentrations of the corresponding extract substances in the coffee extract solution. The temperature of the pre-loading solution can range from about 20° C. to about 100° C. and preferably from about 70° C. to about 90° C. In a column containing about 500 kg. of activated charcoal and having a flow rate of from about 5 to about 25 m$^3$/hr., preferably from about 5 to about 10 m$^3$/hr., the pre-loading period generally requires from about 2 to about 10 hours, preferably from about 6 to about 8 hours. The pre-loading may occur without recirculating the pre-loading solution wherein the adsorption agent is allowed to remain with the solution in a container heated to the desired temperature.

There is a further beneficial effect on the quality of the prepare decaffeinated coffee with respect to its color, when the adsorption agent, particularly activated charcoal, is also pre-loaded with an acid. The acid can be added to the described solution of pre-loading substances or passed apart from the latter in a separate solution. Acceptable acids are those permitted for foodstuff treatment such as, for example, acetic acid, hydrochloric acid, formic acid, etc. Preferably, acids are used which are contained in coffee in the natural state. The concentration of acid in the solution may vary from about 0.5% to about 3% by weight. Subsequent to the acid treatment, the adsorption agent is rinsed with water.

Adsorption of the Caffeine

Green or raw coffee is extracted with water or an aqueous liquid and caffeine is adsorbed from the liquid by means of the pre-loaded adsorption agent. Preferably, a batch of coffee is mixed in an extractor with the extracting liquid and the aqueous extract solution is recirculated through a filter and through one or several adsorption columns in the circuit until it is free of caffeine.

In order to obtain a high utilization of the adsorption capacity of the adsorption agent, it is preferable to employ two or more adsorption columns. For each batch, the extract solution from the extractor is first passed through one or several adsorption columns which have been previously used and then passed through a column with fresh, pre-loaded adsorption agent. In addition, it is possible to arrange the columns in series in the circuit or switch them into the circuit individually and sequentially in time. At the end of the adsorption of the caffeine from a batch of extract solution, the column which has been used the longest is rinsed, emptied, refilled with the adsorption agent and pre-loaded.

As the liquid for extracting the green or raw coffee, it is preferred to use a caffeine-free coffee extract solution whose concentrations of coffee content substances are so high that the solution dissolves substantially only caffeine. This is achieved due to the presence of concentrations of other extractable substances in the solution which are in equilibrium with the concentrations of the corresponding substances in the coffee beans. This equilibrium is further maintained since the pre-loaded adsorption agent adsorbs substantially only caffeine from the solution. The beans treated in this way must only be subsequently dried prior to further treatment.

In another embodiment of the invention, water is used as the extracting liquid. Suitably used is the rinse water which is derived from rinsing the adsorption column which has been in longest use in the adsorption of a preceding batch of extract solution. This rinse water is preferred since it contains a significant concentration of coffee extract residues. In this embodiment, there are also extract substances other than caffeine dissolved out which, after the adsorption of the caffeine, must again be combined with the beans. For this purpose, subsequent to the adsorption procedure, the beans are separated from the extract solution and dried by means of hot air or under vacuum to a moisture content ranging between 10 and 40% by weight. The extract solution is concentrated under a vacuum in a distiller until the ratio of filled coffee weight (kg.) to concentrated extract solution (liter) has reached a value between about 5:1 and about 5:4. The concentrated extract solution is then placed together with the dried beans at a temperature of between about 40° C. and about 100° C., preferably between about 60° C. and 80° C. and adsorbed by the beans. Subsequently, the beans are again dried to the desired moisture content.

Suitable conditions for the described extraction and adsorption of caffeine are as follows:
Flow rate of the process liquid in the circuit through extractor and adsorption column(s): 5-25 m$^3$/hr.;
Temperature: 40°-100° C., preferably 70°-90° C.;
Duration: 6-12 hr.;
Ratio of process liquid quantity (water quantity) to coffee quantity: 1:1 to 5:1.

The described rinsing of the adsorption column in longest use can take place after every adsorption cycle as follows: rinsing one or more times with water, to which acids of the type also used for pre-loading can be added if necessary. If available, the condensate from the described distillation of the extract solution may be used as the rinse water in lieu of or in addition to fresh water. Preferably, the rinse water is pumped from a heated rinse water tank in the circuit and through the adsorption column taken out of operation. Rinse water temperatures generally range from about 50° C. to about 100° C., flow rates from about 5 to about 25 $^3$/hr. and rinse periods from about 0.5 about 2 hours. The rinse water may be used afterward as the extracting liquid for the next batch as has been previously described.

According to the present invention, a satisfactory roastable caffeine-free raw coffee is obtained having a bright color and with a good cup quality. The coffee has an extract content of more than 22% ad a caffeine content of less than 0.1% (after roasting).

EXAMPLE

In a pre-loading tank with a 2500 liter capacity, 2000 liters of water, 50 kg. of cane sugar and 10 kg. of formic acid (99/100%) are mixed and heated to 80° C. This solution is passed for a period of 10 hours in the circuit through an activated charcoal column having 500 kg. of activated charcoal. The rate of flow is 10 m$^3$/hr. Following this, the solution is pumped back into the preloading tank. The activated charcoal is then rinsed with 1000 liters of cold fresh water.

In an extractor with a 9000 liter capacity, 2500 kg. of raw coffee and 7000 liters of water are mixed. The liquid or extract solution is pumped through a filter at 70° C. and 15 m.³/hr. in the circuit through the pre-loaded activated charcoal column. After eight hours, the extract solution is practically caffeine-free. The total aqueous extract solution is placed in a distiller and concentrated under a vacuum to 1000 liters. The beans are dried by hot air to 30% moisture content. Subsequently, the concentrated extract solution and the dried beans are placed together in the extractor. The beans completely absorb the entire extract solution at 75° C. within three hours. The beans are then dried by hot air to a moisture content of 10%.

The column taken out of operation is rinsed three times, each time using 2000 liters of condensate of the distillation or fresh water which additionally contains 2–4 kg. of formic acid (99/100%). The column is rinsed at 90° C. each time for 90 minutes, using a rinsing tank-to-column-to-rinsing tank circuit. The rinsing water is collected and used as extracting water for the following batch.

The extract content and the coffee content of the untreated raw coffee and the treated caffeine-free raw coffee were measured each time after roasting according to the regulations of the Swiss foodstuffs law. The untreated coffee contains after roasting 28% extract substances and 1.3% caffeine. The same coffee, treated in accordance with the present invention, contains after roasting 23.5% extract substances and 0.04% caffeine.

As may be seen from the above description and specific example, raw coffee that is treated in accordance with the present invention may be further processed to yield a product that contains substantially all of the originally present extract substances, but which is substantially caffeine free.

Although the invention has been described with preferred embodiments, it is to be understood that variations and modifications may be resorted to as will be apparent to those skilled in the art. For example, although the process has been described on a batch basis, it may likewise be performed on a semi-continuous or continuous basis. These variations and modifications are to be considered within the scope of the following claims.

We claim:

1. A process for extracting caffeine from raw coffee beans with an aqueous liquid and adsorbing the caffeine from said aqueous liquid by contact with a solid adsorption agent which process comprises:
    (a) passing a first caffeine-free aqueous coffee extract solution through an extraction zone containing raw coffee beans to form a second aqueous coffee extract solution, said first caffeine-free coffee extract solution containing a concentration of coffee extract substances including sucrose such that an equilibrium is present so that substantially only caffeine is dissolved from the raw coffee beans;
    (b) contacting said second aqueous coffee extract solution with an adsorption agent to adsorb caffeine from said second solution onto said adsorption agent, said adsorption agent being pre-loaded with a quantity of at least one substance found in raw coffee beans and consisting essentially of sucrose such that during the contacting of said second coffee extract solution with said adsorption agent, caffeine is adsorbed and an equilibrium is present between the sucrose in said second aqueous extract solution and that contained on said adsorption agent such that the concentration of sucrose in said second coffee extract solution remains substantially unchanged; and
    (c) recovering said extracted raw coffee beans whereby extractable substances other than caffeine are substantially not lost.

2. The process of claim 1 wherein the adsorption agent is treated with acid and rinsed with water before adsorbing caffeine.

3. The process of claim 2 wherein the adsorption agent is treated with at least one acid naturally contained in coffee.

4. The process of claim 2 wherein the adsorption agent is treated with at least one acid selected from the group consisting of acetic, formic and hydrochloric acids.

5. The process of claim 1 wherein the second aqueous coffee extract solution is contacted with said pre-loaded adsorption agent by passing said solution through at least one column containing said pre-loaded adsorption agent.

6. The process of claim 5 wherein at least two adsorption columns are used in a way such that the liquid coming from the extraction zone flows through at least one column with adsorption agent which has been previously used for adsorbing caffeine and afterward through a column with fresh adsorption agent.

7. The process of claim 1 wherein said recovered raw coffee beans are dried to a moisture content of 10 percent by weight.

8. The process of claim 1 wherein said adsorption agent is activated charcoal.

* * * * *